United States Patent
Choi et al.

(10) Patent No.: US 9,900,091 B2
(45) Date of Patent: Feb. 20, 2018

(54) METHOD AND APPARATUS FOR PAIRING ELECTRONIC DEVICE AND LIGHTING DEVICE

(71) Applicant: Samsung Electronics Co., Ltd., Suwon-si, Gyeonggi-do (KR)

(72) Inventors: Dae-Kyu Choi, Suwon-si (KR); Yong-Seok Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 114 days.

(21) Appl. No.: 14/749,135

(22) Filed: Jun. 24, 2015

(65) Prior Publication Data

US 2015/0372754 A1  Dec. 24, 2015

(30) Foreign Application Priority Data

Jun. 24, 2014 (KR) .................. 10-2014-0077297
Jun. 23, 2015 (KR) .................. 10-2015-0089064

(51) Int. Cl.
*G06K 9/00* (2006.01)
*H04B 10/116* (2013.01)
(Continued)

(52) U.S. Cl.
CPC .......... *H04B 10/116* (2013.01); *G06F 21/35* (2013.01); *G06F 21/445* (2013.01); *H04L 63/1466* (2013.01); *H04W 4/005* (2013.01); *H04W 12/06* (2013.01); *H04W 76/02* (2013.01); *H05B 37/0245* (2013.01); *G06F 2221/2103* (2013.01);
(Continued)

(58) Field of Classification Search
None
See application file for complete search history.

(56) References Cited

U.S. PATENT DOCUMENTS 5,261,047 A * 11/1993 Rivshin ................ G06F 13/362
358/1.17
8,020,197 B2 * 9/2011 Shiran .................... H04L 9/321
713/158

(Continued)

FOREIGN PATENT DOCUMENTS

JP          2014229362        * 12/2014
KR    10-2004-0018874 A         3/2005

*Primary Examiner* — Nancy Bitar
(74) *Attorney, Agent, or Firm* — Jefferson IP Law, LLP

(57) ABSTRACT

The present disclosure relates to a sensor network, machine type communication (MTC), machine-to-machine (M2M) communication, and technology for internet of things (IoT). The present disclosure may be applied to intelligent services based on the above technologies, such as smart home, smart building, smart city, smart car, connected car, health care, digital education, smart retail, security and safety services. A method of an electronic device for pairing with a lighting device is provided. The method includes acquiring an image photographing the lighting device, acquiring identification data of the lighting device from the image, and pairing with the lighting device by transmitting the identification data to the lighting device. Further, a method of a lighting device for pairing with an electronic device is provided. The method includes outputting light based on first identification data, receiving second identification data, determining whether to pair with the electronic device, and pairing with the electronic device.

14 Claims, 13 Drawing Sheets

(51) Int. Cl.
*H05B 37/02* (2006.01)
*H04W 76/02* (2009.01)
*H04W 4/00* (2018.01)
*H04W 12/06* (2009.01)
*H04L 29/06* (2006.01)
*G06F 21/35* (2013.01)
*G06F 21/44* (2013.01)
*H04W 84/18* (2009.01)
*H04W 12/02* (2009.01)

(52) U.S. Cl.
CPC .............. *H04L 63/18* (2013.01); *H04W 4/008* (2013.01); *H04W 12/02* (2013.01); *H04W 84/18* (2013.01)

(56) References Cited

U.S. PATENT DOCUMENTS

| | | | | |
|---|---|---|---|---|
| 8,495,729 B2* | 7/2013 | Park | ................. | H04L 29/12009 709/220 |
| 8,555,065 B2* | 10/2013 | Cesnik | ............. | H04N 21/44008 713/168 |
| 8,848,029 B2* | 9/2014 | Moletti | ............... | H05B 37/0227 348/14.08 |
| 9,137,877 B2* | 9/2015 | Kim | ................... | H05B 37/0227 |
| 9,392,578 B2* | 7/2016 | Venkatraman | ....... | H04B 7/0452 |
| 2012/0300011 A1* | 11/2012 | Moletti | ............. | H05B 37/0227 348/14.01 |
| 2013/0051553 A1* | 2/2013 | Cesnik | ............. | H04N 21/44008 380/200 |
| 2013/0320862 A1* | 12/2013 | Campbell | .......... | H05B 37/0218 315/152 |
| 2014/0062309 A1* | 3/2014 | Kim | ................... | H05B 37/0227 315/132 |
| 2014/0113598 A1* | 4/2014 | Conti | .................... | G06F 3/1446 455/414.1 |
| 2015/0289345 A1* | 10/2015 | Lee | ................... | H05B 37/0218 315/153 |
| 2016/0050553 A1* | 2/2016 | Kang | ................. | G06Q 30/0601 455/41.2 |
| 2016/0323257 A1* | 11/2016 | Kang | ..................... | H04L 63/08 |
| 2016/0323283 A1* | 11/2016 | Kang | ..................... | H04L 63/08 |

\* cited by examiner

METHOD AND APPARATUS FOR PAIRING ELECTRONIC DEVICE AND LIGHTING DEVICE

CROSS-REFERENCE TO RELATED APPLICATION(S)

This application claims the benefit under 35 U.S.C. §119(a) of a Korean patent application filed on Jun. 24, 2014 in the Korean Intellectual Property Office and assigned Serial number 10-2014-0077297, and of a Korean patent application filed on Jun. 23, 2015 in the Korean Intellectual Property Office and assigned Serial number 10-2015-0089064, the entire disclosure of each of which is hereby incorporated by reference.

TECHNICAL FIELD

The present disclosure relates to pairing of an electronic device and a lighting device.

BACKGROUND

The Internet, which is a human centered connectivity network where humans generate and consume information, is now evolving to the internet of things (IoT) where distributed entities, such as things, exchange and process information without human intervention. The internet of everything (IoE), which is a combination of the IoT technology and the Big Data processing technology through connection with a cloud server, has emerged. As technology elements, such as "sensing technology", "wired/wireless communication and network infrastructure", "service interface technology", and "security technology" have been in demand for IoT implementation, a sensor network, machine-to-machine (M2M) communication, machine type communication (MTC), and so forth have been recently researched.

Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

As communications technology advances, there is a growing interest in a communication method which interconnects various communication devices with the IoT and/or the IoE. For example, a smart phone of a user can be paired with a lighting device having Bluetooth functionality and thus the smart phone can control the lighting device.

FIGS. 1A and 1B depict pairing between a smart phone and a lighting device according to the related art.

Referring to FIG. 1A, there are three lighting devices 1, 2, and 3 in a home of a first user and three lighting devices A, B, and C in a home of a second user next to the home of the first user.

In FIG. 1A, when the first user wants to control a particular lighting device in his/her home using the smart phone 100, the pairing with a particular lighting device of the related art measures a received signal strength from the ambient lighting devices and provides the measured received signal strength information to the user so that the user can select the lighting device to pair with. For example, the smart phone 100 measures the received signal strength from the three lighting devices in the first user's home and the three lighting devices in the second user's home as shown in FIG. 1A. Next, the smart phone 100 displays the received signal strength of the lighting devices on a screen and requests the user to select the lighting device to pair as shown in FIG. 1B. However, the received signal strength of the lighting devices measured by the smart phone changes according to time and surrounding conditions, and it is difficult for the user to correctly select the intended lighting device merely based on the received signal strength of the lighting devices. Further, since the smart phone of the related art and the lighting device employ Just Work model of pairing models according to the related art, they can be exposed to a man-in-the-middle attack (MITM).

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address the above-mentioned problems and/or disadvantages and to provide at least the advantages described below. Accordingly, an aspect of the present disclosure is to provide a method and an apparatus for enhancing security if an electronic device and a lighting device are paired.

Another aspect of the present disclosure is to provide a method and an apparatus for selecting a lighting device to pair in an electronic device.

Another aspect of the present disclosure is to provide a method and an apparatus of an electronic device for acquiring identification data of a corresponding lighting device by photographing the lighting device to pair with, transmitting the acquired identification data to ambient lighting devices, and thus notifying the lighting device to pair with.

Another aspect of the present disclosure is to provide a method and an apparatus of an electronic device for selecting and pairing a lighting device based on a color and a cycle of the lighting device.

Another aspect of the present disclosure is to provide a method and an apparatus of an electronic device for generating a temporary key (TK) based on data acquired by photographing a lighting device, and encrypting pairing with the generated TK.

Another aspect of the present disclosure is to provide a method and an apparatus of a lighting device for controlling a light color and/or a lighting cycle and determining whether to pair with a corresponding electronic device based on the light color and/or the lighting cycle received from the electronic device.

Another aspect of the present disclosure is to provide a method and an apparatus of a lighting device for generating a TK based on a light color and/or a lighting cycle and encrypting pairing with the generated TK.

In accordance with an aspect of the present disclosure, a method of an electronic device for pairing with a lighting device is provided. The method includes acquiring an image by photographing the lighting device, acquiring identification data of the lighting device from the image, and pairing with the lighting device by transmitting the identification data to the lighting device.

In accordance with another aspect of the present disclosure, a method of a lighting device for pairing with an electronic device is provided. The method includes outputting light based on first identification data of the lighting device, receiving second identification data from the electronic device, determining whether to pair with the electronic device by comparing the first identification data with the second identification data, and if determining to pair with the electronic device, pairing with the electronic device.

In accordance with another aspect of the present disclosure, an electronic device for pairing with a lighting device is provided. The electronic device includes a communication unit configured to transmit and receive signals for pairing to and from the lighting device, a camera unit configured to acquire an image photographing a lighting device, and a processor configured to acquire identification data of the lighting device, and pair with the lighting device by transmitting the identification data to the lighting device.

In accordance with another aspect of the present disclosure, a lighting device for pairing with an electronic device is provided. The lighting device includes a communication module configured to transmit and receive signals for pairing to and from an electronic device, a light output module configured to output light based on first identification data of the lighting device, and a processor configured to determine whether to pair with the electronic device by comparing second identification data received from the electronic device through the communication module with the first identification data, and if determining to pair with the electronic device, pair with the electronic device.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1A:
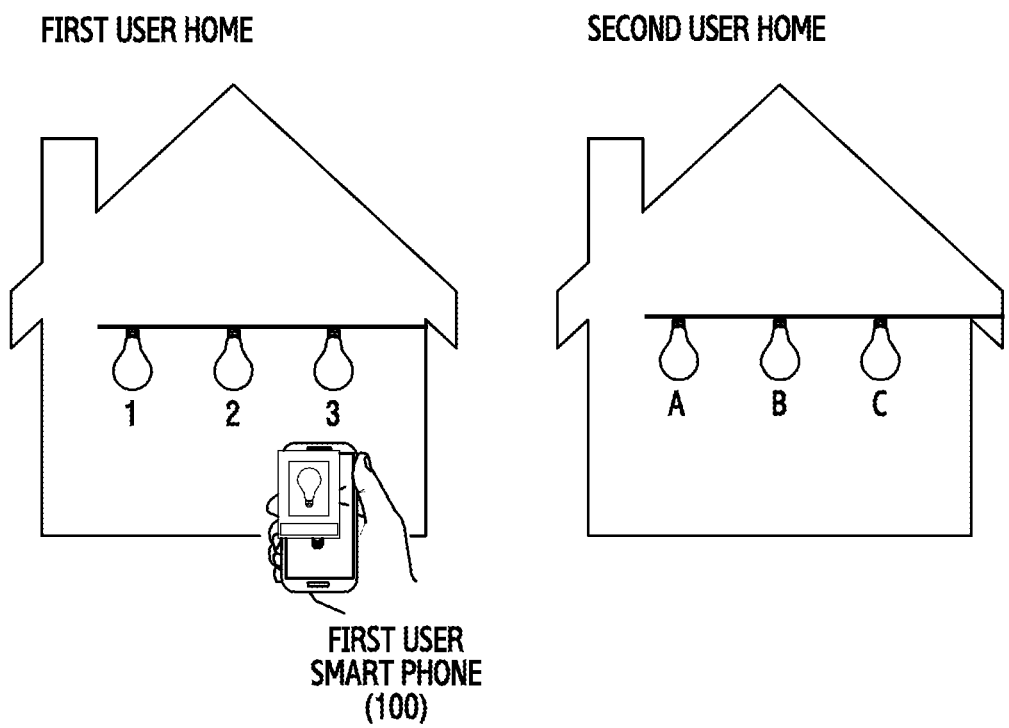
FIGS. 1A and 1B illustrate pairing between a smart phone and a lighting device according to the related art.
Figure 1B:
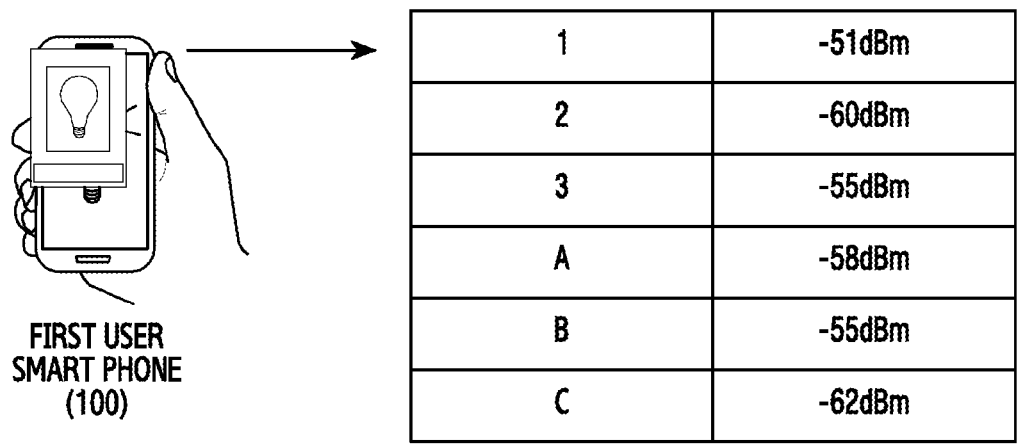

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used in the present disclosure, terms such as "includes" or "may include" refer to the presence of the corresponding function, operation or feature, and do not limit the presence of additional functions, operations or features. Also, terms such as "includes" or "has" refers to the presence of characteristics, numbers, steps, operations, components or combinations thereof, and is not intended to exclude one or more additional characteristics, numbers, steps, operations, components or combinations thereof.

As used in the present disclosure, the term "or" is used to include any and all combination of terms listed. For examples, "A or B" includes only A, only B, or both A and B. As used in the present disclosure, terms such as "first" or "second" may be used to describe various features, but do not limit such features. For example, the terms do not limit the order and/or the importance of their associated features. Such terms may be used to differentiate one feature from another. For example, a first user equipment (UE) and a second UE are both UEs, but are different UEs. For example, without departing from the scope of the present disclosure, a first component may be called a second component, and likewise, a second component may be called a first component.

If a component is said to be "connected with" or "connected to" another component, the component may be directly connected with, or connected to, the other component, or another component may exist in between. On the other hand, if a component is said to be "directly connected with" or "directly connected to" another component, it should be understood that no components exist in between.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Unless defined otherwise, all terms used herein have the same meaning as commonly understood by those of skill in the art. Such terms as those defined in a generally used dictionary are to be interpreted to have the meanings equal to the contextual meanings in the relevant field of art, and are not to be interpreted to have ideal or excessively formal meanings unless clearly defined in the present specification.

An electronic device according to various embodiments of the present disclosure can be a device including communication functionality. For example, the electronic device may include at least one of a smart phone, a tablet personal computer (PC), a mobile phone, a video phone, an e-book reader, a desktop PC, a laptop PC, a netbook computer, a personal digital assistant (PDA), a portable multimedia player (PMP), a moving picture experts group audio layer 3 (MP3) player, a mobile medical appliance, a camera, and a wearable device (e.g., a head mounted device (HMD) such as electronic glasses, electronic textiles, an electronic bracelet, an electronic necklace, an electronic appcessory, an electronic tattoo, and a smart watch).

According to various embodiments of the present disclosure, an electronic device may be a smart home appliance having the communication functionality. The smart home appliance may include, for example, at least one of a television, a digital versatile disc (DVD) player, an audio system, a refrigerator, an air conditioner, a vacuum cleaner, an oven, a microwave oven, a washing machine, an air purifier, a set-top box, a television (TV) box (e.g., Samsung HomeSync™, AppleTV™, or Google TV™), a game console, an electronic dictionary, a digital key, a camcorder, and a digital frame.

According to various embodiments of the present disclosure, an electronic device may include at least one of various medical appliances (e.g., magnetic resonance angiography (MRA), magnetic resonance imaging (MRI), computed tomography (CT), X-ray system, ultrasonicator)), a navigation device, a global positioning system (GPS) receiver, an event data recorder (EDR), a flight data recorder (FDR), an in-vehicle infotainment device, marine electronic equipment (e.g., a marine navigation device and a gyro compass), an avionic system, a security device, a vehicle head unit, an industrial or home robot, an automatic teller's machine (ATM) of a financial company, and a point of sale (POS) of a store.

According to various embodiments of the present disclosure, an electronic device may include at least one of a part of furniture or building/structure having the communication functionality, an electronic board, an electronic signature receiving device, a projector, and various gauges (e.g., gauges for water, electricity, gas, and radio waves). The electronic device may be one or a combination of those various devices. The electronic device may be a flexible device. Also, those skilled in the art should understand that the electronic device is not limited to those devices.

Hereinafter, various embodiments of the present disclosure provide an electronic device by referring to the attached drawings. The term 'user' used in various embodiments of the present disclosure may represent a person or a device (e.g., an artificial intelligent electronic device) who or which uses the electronic device.

Hereinafter, the lighting device indicates a device capable of outputting light and communicating with an electronic device.

Figure 2:
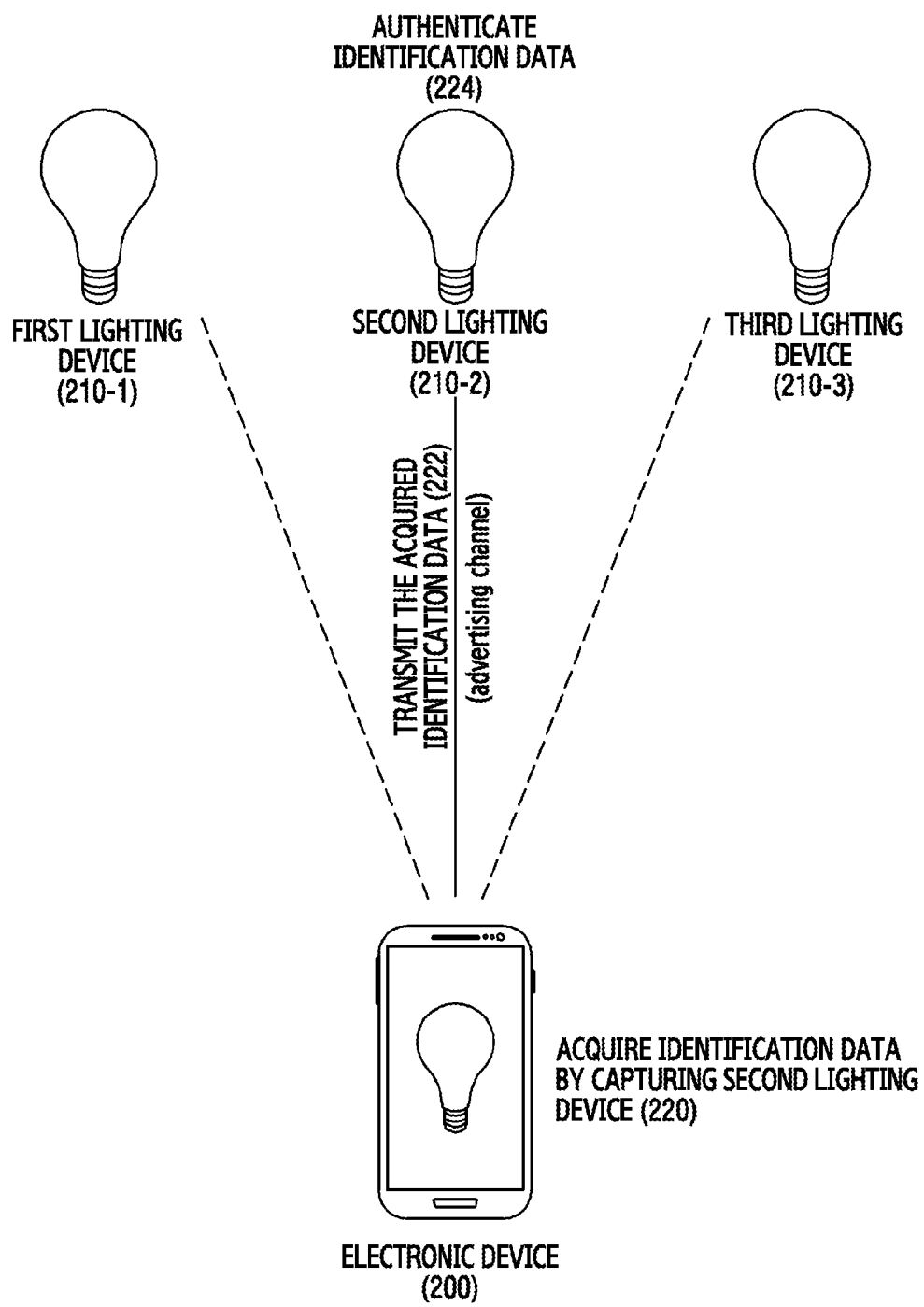
FIG. 2 illustrates pairing between an electronic device and a lighting device according to an embodiment of the present disclosure.

FIG. 2 depicts simplified pairing between an electronic device and a lighting device according to an embodiment of the present disclosure.

Referring to FIG. 2, it is assumed that three electronic devices, that is, a first lighting device 210-1, a second lighting device 210-2, and a third lighting device 210-3 are present and an electronic device 200 wants to pair with the second lighting device 210-2. It is noted that the present disclose is equally applied to at least one lighting device.

In FIG. 2, the electronic device 200 photographs the second lighting device 210-2 to pair with. By photographing the second lighting device 210-2, the electronic device 200 acquires data for identifying the second lighting device 210-2 in operation 220. For example, the electronic device 200 acquires a red green blue (RGB) value of the second lighting device 210-2 from an image photographing the second lighting device 210-2. For example, the electronic device 200 photographs the second lighting device 210-2 during a certain time (e.g., for a certain duration) and thus acquires a cycle value indicating the number of lighting on/off times of the second lighting device 210-2. For example, the electronic device 200 measures the number of the on/off times of the lighting device during 10 seconds. That is, the electronic device 200 acquires the RGB value or the lighting cycle value of the lighting device as the identification data of the second lighting device 210-2.

Next, the electronic device 200 transmits the acquired identification data to the first lighting device 210-1, the second lighting device 210-2, and the third lighting device 210-3 in operation 222. For example, the electronic device 200 may transmit an advertisement message including the acquired identification information to the first lighting device 210-1, the second lighting device 210-2, and the third lighting device 210-3, via an advertising channel. Beside the advertisement message transmitted in the advertising channel, the electronic device 200 may transmit another message including the identification data to the first lighting device 210-1, the second lighting device 210-2, and the third lighting device 210-3, via another channel.

Each of the first lighting device 210-1, the second lighting device 210-2, and the third lighting device 210-3 performs authentication based on the identification data received from the electronic device 200 in operation 224. That is, each of the first lighting device 210-1, the second lighting device 210-2, and the third lighting device 210-3 compares the identification data received from the electronic device 200 with their identification data and thus determines which one of them the electronic device 200 wants to pair with. For example, the second lighting device 210-2 compares the identification data received from the electronic device 200 with its identification data, confirms that the received identification data matches its identification data, and determines that the electronic device 200 wants to pair with it. Hence, the second lighting device 210-2 performs the pairing by transmitting a response signal to the electronic device 200. For example, the first lighting device 210-1 and the third lighting device 210-3 each compare the identification data received from the electronic device 200 with their own identification data, confirm that the received identification data is different from their identification data, and determine that the electronic device 200 does not want to pair with them. Accordingly, the first lighting device 210-1 and the third lighting device 210-3 may not respond.

In addition, the electronic device 200 and the second lighting device 210-2 may generate and use a temporary key (TK) for the pairing based on the identification data (e.g., the RGB value or the lighting cycle value of the light) used for the authentication. For example, the electronic device 200 and the second lighting device 210-2 may encrypt a link layer in the pairing with the TK generated based on the identification data.

Figure 3A:
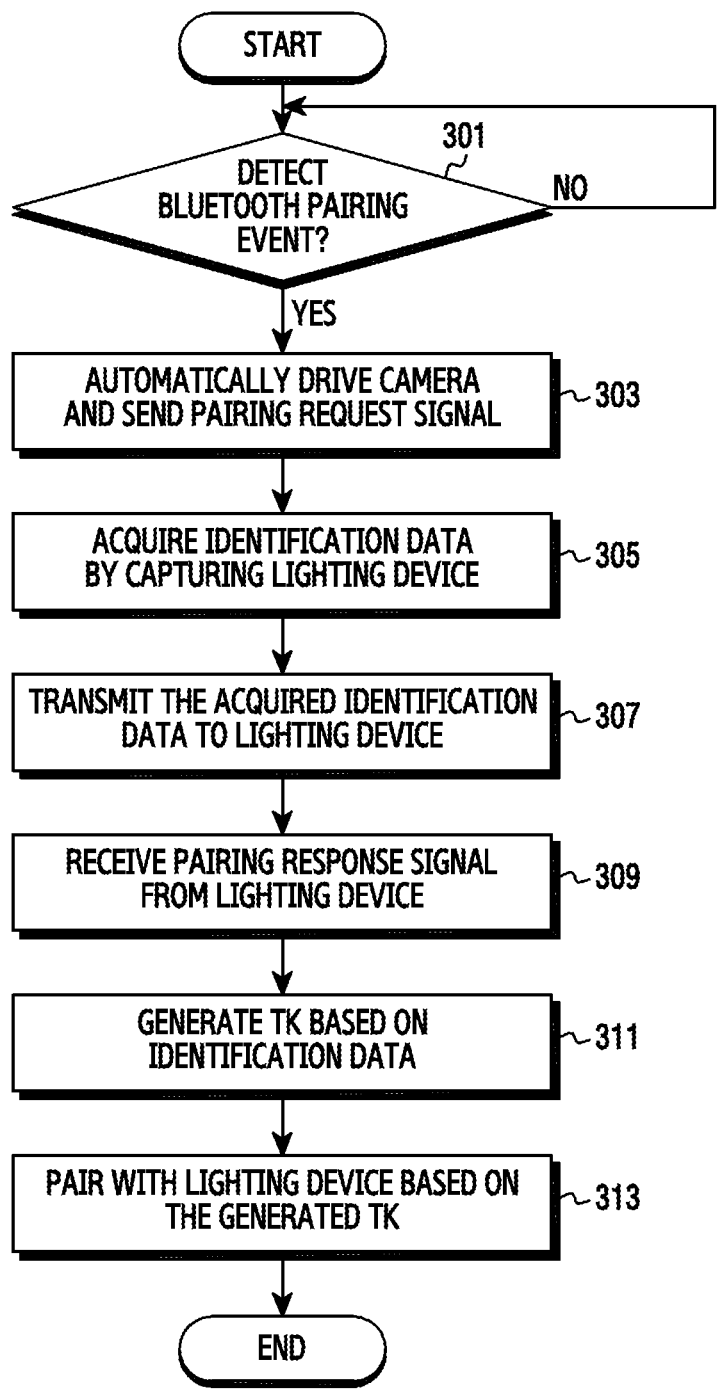
FIG. 3A illustrates a pairing method of an electronic device according to an embodiment of the present disclosure.

FIG. 3A illustrates a pairing method of an electronic device according to an embodiment of the present disclosure.

Referring to FIG. 3A, the electronic device 200 determines whether a Bluetooth (BT) pairing event takes place in operation 301. The BT pairing event may be generated by a user input or a particular application execution. For example, a user input for controlling a particular lighting device or an application for controlling a lighting device may generate the BT pairing event. More specifically, in the application for controlling the lighting device supporting BT, if a pairing menu or a pairing mode with the lighting device is selected, the BT pairing event may be detected.

Figure 4A:
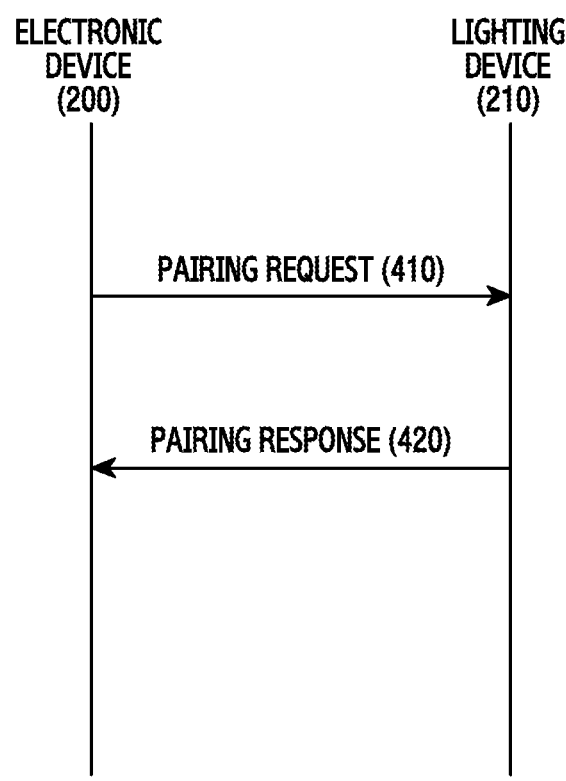
FIGS. 4A and 4B illustrate a pairing request message and a pairing response message according to various embodiments of the present disclosure.
Figure 4B:
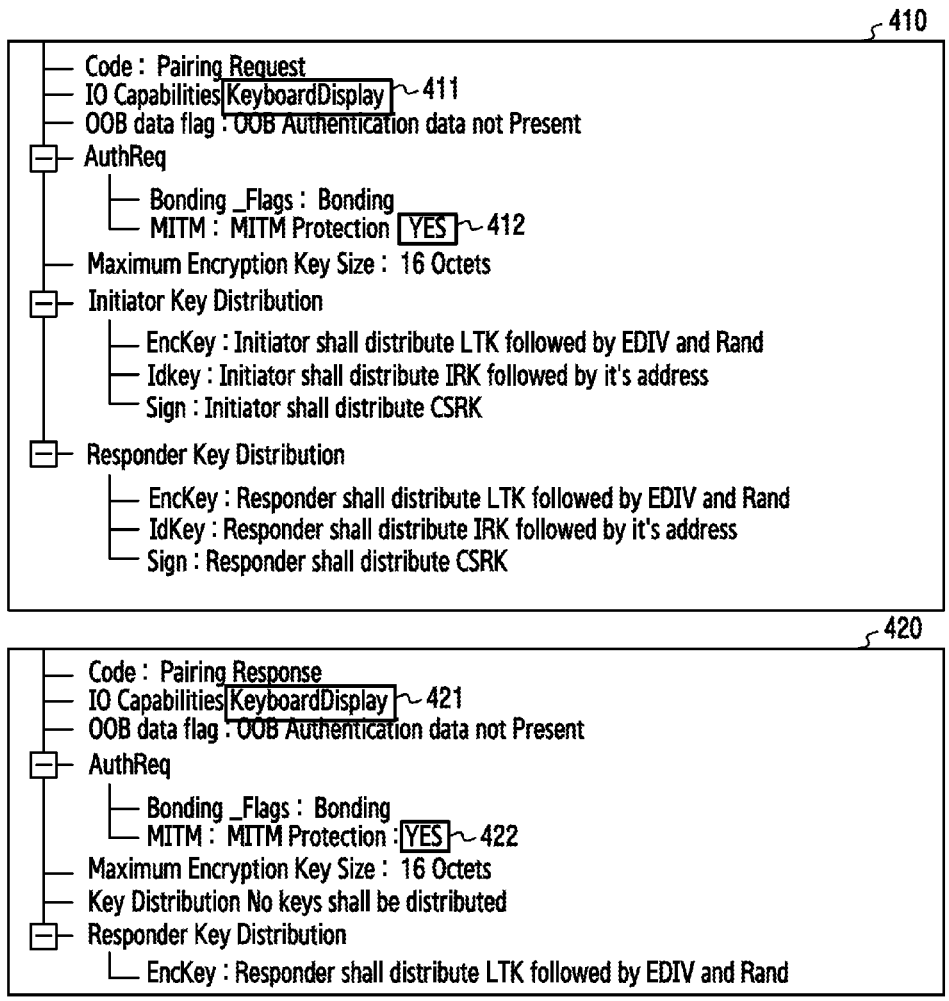

If detecting the BT pairing event, the electronic device 200 automatically drives a camera and transmits a pairing request signal in operation 303. For example, upon detecting the BT pairing event, the electronic device 200 may automatically drive the camera to photograph an adjacent lighting device and transmit the pairing request signal to the ambient lighting devices. For example, the electronic device 200 may transmit a pairing request signal 410 including input/output (IO) capability being keyboard/display 411 and man-in-the-middle attack (MITM) being Yes 412 as shown in FIGS. 4A and 4B. Herein, IO capability indicates whether the electronic device 200 may input and output data.

FIGS. 4A and 4B illustrate a pairing request message and a pairing response message according to various embodiments of the present disclosure.

Referring to FIG. 4B, the electronic device 200 allows the input through the keyboard and the screen display. MITM indicates protection from the MITM using the TK. Referring to FIG. 4B, the electronic device 200 may block the MITM using the TK.

In operation 305, the electronic device 200 acquires identification data by photographing the lighting device. For example, the electronic device 200 may photograph the lighting device using the camera automatically driven, acquire a photographed image (still image), and extract an RGB value of the lighting device from the photographed image. For example, the electronic device 200 may create a video by filming the lighting device during a certain time using the camera automatically driven, and acquire a lighting cycle value by analyzing images of the created video. Herein, the electronic device 200 may acquire the photographed image or the video by filming the lighting device according to a user's input using the camera automatically driven.

In operation 307, the electronic device 200 transmits the acquired identification data to the lighting device. For example, the electronic device 200 includes the RGB value of the lighting device acquired from the photographed image or the lighting cycle value acquired from the video, into an advertisement message, and transmits the advertisement message to at least one lighting device in vicinity over an advertising channel.

In operation 309, the electronic device 200 receives a pairing response signal from the lighting device. For example, the electronic device 200 may receive the pairing response signal from the lighting device 210 photographed by the electronic device 200.

As shown in FIGS. 4A and 4B, a pairing response signal 420 may include IO capability being keyboard/display 421 and MITM being Yes 422. Herein, IO capability indicates whether the electronic device 200 may input and output data, and MITM indicates protection from the MITM using the TK. While the lighting device 210 does not enable the keyboard input and the screen display and may not receive the TK, IO capability of the pairing response signal 420 can indicate keyboard/display 421 and MITM can indicate Yes under control of the lighting device 210. This is to generate the TK value based on the identification data of the lighting device and to perform the pairing in a passkey entry mode. Herein, the passkey entry mode is one of the well-known BT pairing modes.

Figure 5:
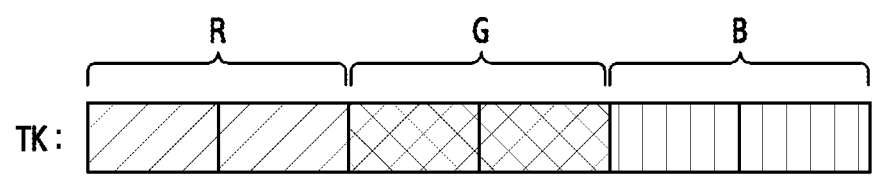
FIG. 5 illustrates a temporary key (TK) generated based on color data of a lighting device according to an embodiment of the present disclosure.

FIG. 5 illustrates a temporary key (TK) generated based on color data of a lighting device according to an embodiment of the present disclosure.

In operation 311, the electronic device 200 generates the TK based on the identification data. For example, the electronic device 200 can generate a 6-digit TK based on the RGB value or the lighting cycle of the lighting device. The electronic device 200 can generate a 6-digit TK by multiplying the lighting cycle by a fixed value k. According to an embodiment of the present disclosure, the electronic device 200 can generate 2 digits of the 6-digit TK using the R value of the RGB value of the lighting device, generate other 2 digits using the G value, and generate the remaining 2 digits using the B value as shown in FIG. 5.

The electronic device 200 can convert the RGB to a 6-digit TK using a well-known color quantization. For example, the electronic device 200 can convert the RGB to the TK using the color quantization which converts the R value, the G value, and the B value of 255 ranges to certain levels (e.g., 10 levels). For example, the well-known color quantization can include uniform color quantization, a popularity algorithm, a median cut algorithm, an octree algorithm, etc. The uniform quantization divides R, G, and B into equal sized segments. For example, the uniform quantization compresses the RGB value to 256 ranges by dividing the R value and the G value each to 8 ranges and the B value to 4 ranges. The popularity algorithm generates a list of colors and color counts acquired from a scan image, arranges the colors based on the count in the generated list, and selects top 256 colors. The median cut algorithm converts the RGB value into a 3-dimensional plane and sorts the intended colors. The octree algorithm generates a tree of depth N and selects intended colors by controlling the tree depth.

In operation 313, the electronic device 200 pairs with the lighting device based on the generated TK. For example, the electronic device 200 can perform the authentication based on the TK, perform the link layer encryption by generating a short term key (STK) based on the TK, generate a long term key (LTK) based on the TK and/or the STK, and use the LTK to communicate with the lighting device 210.

Next, the electronic device 200 may finish the pairing process.

Figure 3B:
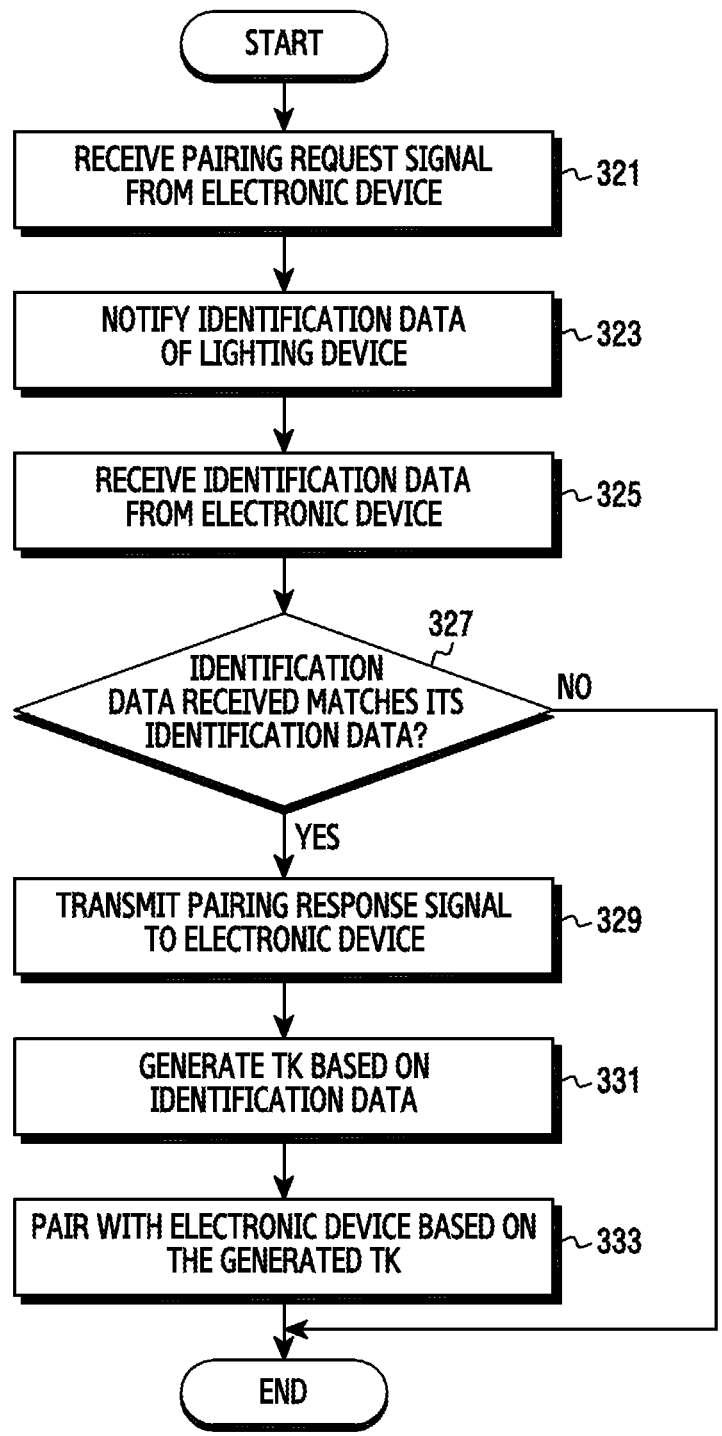
FIG. 3B illustrates a pairing method of a lighting device according to an embodiment of the present disclosure.

FIG. 3B illustrates a pairing method of a lighting device according to an embodiment of the present disclosure.

Referring to FIG. 3B, the lighting device 210 receives a pairing request signal from the electronic device 200 in operation 321, and notifies its identification data to the electronic device 200 in operation 323. For example, the lighting device 210, not paired with the electronic device 200, may generate a random RGB or cycle value based on its media access control (MAC) address for the pairing with the electronic device 200, and output the light according to the generated RGB or cycle value. Herein, since the RGB or cycle value is generated based on the MAC address of the lighting device 210, it can be used as the identification data so as to distinguish the corresponding lighting device 210 from the multiple lighting devices.

Next, the lighting device 210 receives identification data from the electronic device 200 in operation 325, and determines whether the identification data received from the electronic device 200 matches its identification data in operation 327. For example, the lighting device 210 may compare the RGB value received from the electronic device 200 with the RGB value generated in operation 323. For example, the electronic device 200 may compare the lighting cycle value received from the electronic device 200 with the lighting cycle value generated in operation 323. If the identification data received from the electronic device 200 does not match the identification data, the lighting device 210 may recognize that the electronic device 200 wants to pair with another lighting device and finish this process.

If the identification data received from the electronic device 200 matches the identification data, the lighting device 210 recognizes that the electronic device 200 wants to pair with it and transmits a pairing response signal to the electronic device 200 in operation 329. As shown in FIGS. 4A and 4B, the pairing response signal 420 may include IO capability being keyboard/display 421 and MITM being Yes 422. Herein, IO capability indicates whether the lighting device 210 can input and output data, and MITM indicates protection from the MITM using the TK. While the lighting device 210 does not enable the input through the keyboard and the screen display and cannot receive the TK, the lighting device 210 sets IO capability of the pairing response signal 420 to keyboard/display 421 and sets MITM to Yes. This is to generate the TK value based on the identification data of the lighting device 210 and to perform the pairing in the passkey entry mode.

In operation 331, the lighting device 210 generates a TK based on the identification data. For example, the lighting device 210 may generate the TK using the RGB or the lighting cycle based on its MAC address. The lighting device 210 may generate a 6-digit TK by multiplying the lighting cycle by the fixed value k. Herein, the fixed value k may be agreed with the electronic device 200 in advance. According to an embodiment of the present disclosure, the lighting device 210 may generate 2 digits of the 6-digit TK using the R value of the RGB value of the lighting device, generate other 2 digits using the G value, and generate the remaining 2 digits using the B value as shown in FIG. 5. The lighting device 210 can convert the RGB to the 6-digit TK using the well-known color quantization. Herein, the lighting device 210 can generate the TK using the same color quantization as the electronic device 200.

In operation 333, the lighting device 210 pairs with the electronic device 200 based on the generated TK. For example, the lighting device 210 performs the authentication based on the TK, performs the link encryption by generating an STK based on the TK, generate an LTK based on the TK and/or the STK, and use the LTK to communicate with the electronic device 200.

Next, the lighting device 210 can finish the pairing process.

Figure 6:
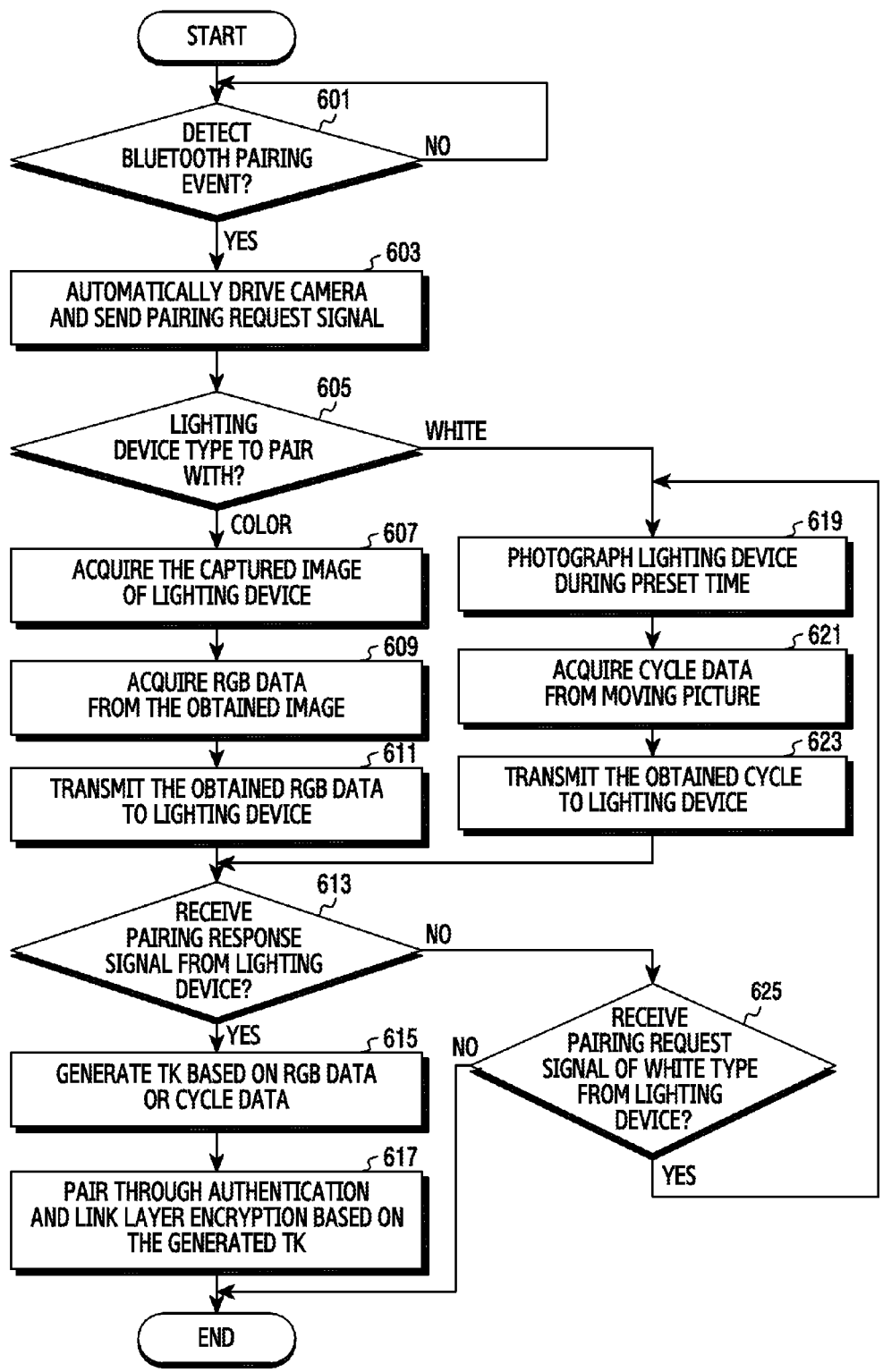
FIG. 6 illustrates a pairing method of an electronic device according to an embodiment of the present disclosure.

FIG. 6 illustrates a pairing method of an electronic device according to an embodiment of the present disclosure.

Referring to FIG. 6, the electronic device 200 determines whether a BT pairing event takes place in operation 601. The BT pairing event can be generated by a user input or a particular application execution. For example, a user input for controlling a particular lighting device or an application for controlling a lighting device can generate the BT pairing event. More specifically, in the application for controlling the lighting device supporting BT, if the pairing menu or the pairing mode with the lighting device is selected, the BT pairing event can be detected.

Upon detecting the BT pairing event, the electronic device 200 can automatically drive the camera and transmit a pairing request signal in operation 603. For example, upon detecting the BT pairing event, the electronic device 200 can automatically drive the camera to photograph the ambient lighting device and transmit the pairing request signal the ambient lighting devices. For example, the electronic device 200 may transmit the pairing request signal 410 including IO capability being keyboard/display 411 and MITM being Yes 412 as shown in FIG. 4B.

In operation 605, the electronic device 200 checks a type of the lighting device to pair with. For example, the electronic device 200 may determine whether the lighting device to pair with is of a color type or a white type. The electronic device 200 may identify the type of the lighting device to pair with according the user input. For example, the electronic device 200 may display an interface requesting to select the type of the lighting device to pair with on the screen, and acquire the type of the lighting device to pair from the user input. If the lighting device to pair with is of a color type, the electronic device 200 can drive or switch a camera mode to a photo mode for acquiring a still picture. If the lighting device to pair with is a white type, the electronic device 200 can drive or switch the camera mode to a video mode for acquiring a moving picture. For example, the electronic device 200 may display an interface requesting to select the camera mode of the lighting device to pair with, and acquire the type of the lighting device to pair according to the user's camera mode. For example, the electronic device 200 may determine that the lighting device to pair is of the color type if the still picture mode is selected, and determine that the lighting device to pair is of the white type if the video mode is selected. For example, the electronic device 200 may determine whether the lighting device to pair is of the color type or the white type by analyzing an input fed from the camera auto driving.

If the lighting device to pair is of the color type, the electronic device 200 acquires the photographed image of the lighting device in operation 607 and acquires RGB data from the acquired image in operation 609. For example, the electronic device 200 may photograph and acquire a still image including the lighting device, and extract the RGB value indicating colors of the lighting device in the acquired image. In operation 611, the electronic device 200 transmits the acquired RGB data to the lighting device 210. In so doing, the electronic device 200 may transmit an advertisement message including the RGB data over an advertising channel. The advertisement message may be transmitted to the multiple lighting devices near the electronic device 200.

By contrast, if the lighting device to pair is of the white type, the electronic device 200 photographs the lighting device during a preset time in operation 619 and acquires cycle data from the video photographing of the lighting device in operation 621. For example, the electronic device 200 may analyze the photographed images of the lighting device during the preset time (e.g., 10 seconds) and thus acquire the lighting cycle value based on the number of the light on/off times during the preset time. In operation 623, the electronic device 200 transmits the acquired cycle data to the lighting device 210. In so doing, the electronic device 200 can transmit an advertisement message including the cycle data over the advertising channel. The advertisement message can be transmitted to the multiple lighting devices near the electronic device 200.

In operation 613, the electronic device 200 determines whether a pairing response signal is received from the lighting device 210. For example, upon receiving the pairing response signal, the electronic device 200 generates the TK based on the RGB data or the cycle data in operation 615. For example, if transmitting the RGB data to the lighting device 210 and receiving the pairing response signal, the electronic device 200 can generate the TK based on the RGB data using the color quantization. For example, if transmitting the cycle data to the lighting device 210 and receiving the pairing response signal, the electronic device 200 can generate the TK by multiplying the cycle data by a preset value.

In operation 617, the electronic device 200 performs the pairing through the authentication and the link layer encryption based on the generated TK. For example, the electronic device 200 may perform the authentication based on the TK, perform the link layer encryption by generating the STK based on the TK, generate the LTK based on the TK and/or the STK, and use the LTK to communicate with the lighting device 210. Next, the electronic device 200 can finish the pairing process.

By contrast, if receiving no pairing response signal, the electronic device 200 determines whether a pairing request signal of the white type is received from the lighting device in operation 625. For example, after transmitting the RGB data, the electronic device 200 determines whether the pairing request signal of the white type, instead of the pairing response signal, is received within a certain time. If receiving the pairing request signal of the white type, the electronic device 200 returns to operation 617.

By contrast, if receiving no pairing request signal of the white type, that is, if receiving neither the pairing response signal nor the pairing request within a certain time, the electronic device 200 determines that the pairing fails and finishes this process. In so doing, the electronic device 200 may display a message indicating the pairing fail on the screen.

Figure 7:
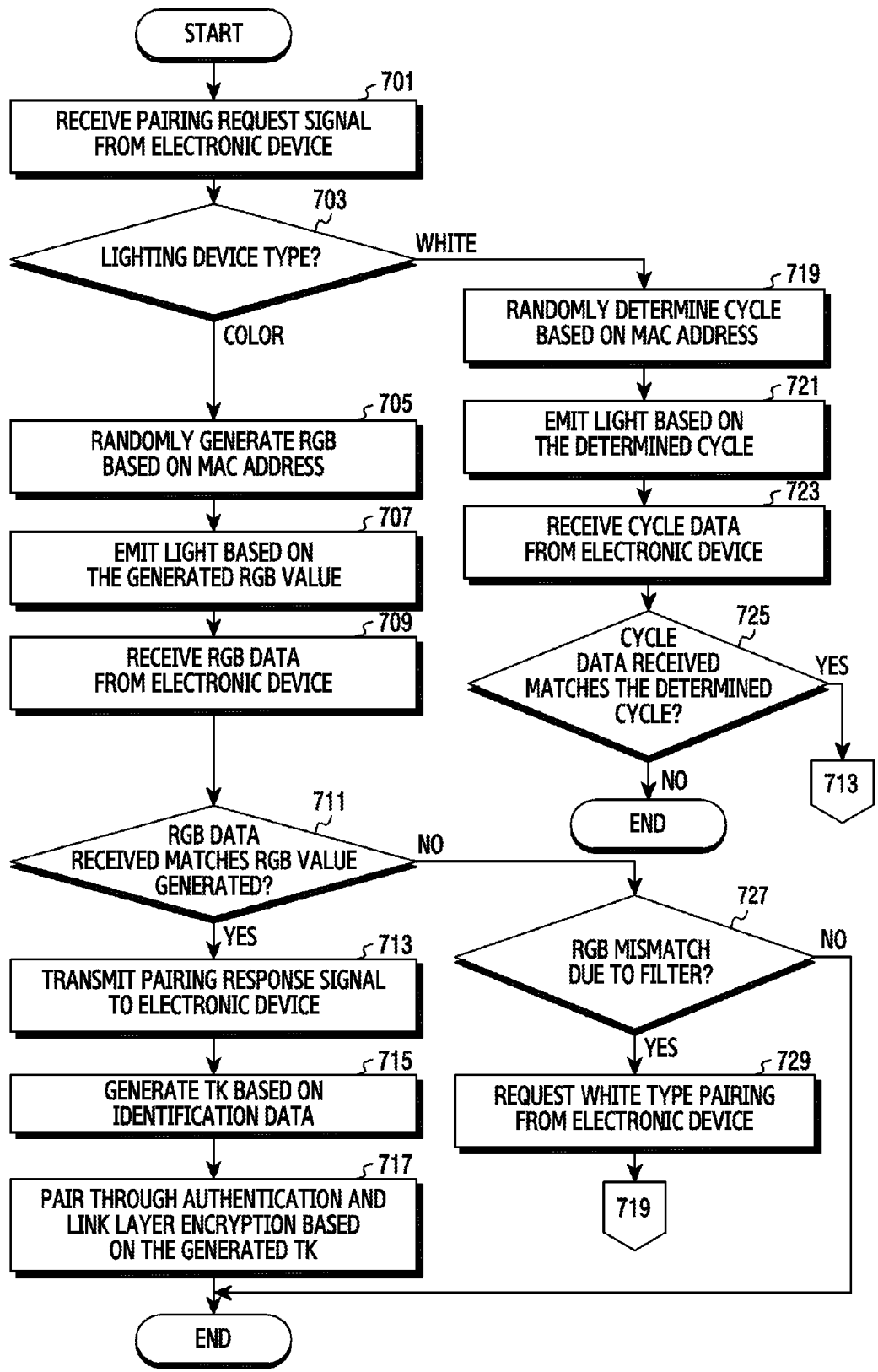
FIG. 7 illustrates a pairing method of a lighting device according to an embodiment of the present disclosure.

FIG. 7 illustrates a pairing method of a lighting device according to an embodiment of the present disclosure.

Referring to FIG. 7, the lighting device 210 receives a pairing request signal from the electronic device 200 in operation 701 and checks the type of the lighting device in operation 703. For example, the lighting device 210 may determine whether it is of the color type or the white type.

For the color type, the lighting device 210 randomly generates the RGB value based on the MAC address in operation 705, and emits the light based on the generated RGB value in operation 707. For example, the lighting device 210 may output the light in the color corresponding to the generated RGB value. In operation 709, the lighting device 210 receives RGB data from the electronic device 200. For example, the lighting device 210 may receive the advertisement message over the advertising channel and extract the RGB data from the advertisement message. In operation 711, the lighting device 210 determines whether the RGB data received from the electronic device 200 matches the RGB value generated in operation 705. If the received RGB data matches the generated RGB value, the lighting device 210 determines that the electronic device 200 wants to pair with it, and transmits a pairing response signal to the electronic device 200 in operation 713. As shown in FIG. 4B, the pairing response signal 420 may include IO capability being keyboard/display 421 and MITM being Yes 422. While the lighting device 210 cannot enable the input through the keyboard and the screen display and receive the TK, the lighting device 210 may set IO capability of the pairing response signal 420 to keyboard/display 421 and sets MITM to Yes. This is to generate the TK value based on the RGB value or the lighting cycle value of the lighting device 210 and to perform the pairing in the passkey entry mode.

In operation 715, the lighting device 210 generates a TK based on the identification data, that is, the RGB data. For example, the lighting device 210 may convert the RGB to a 6-digit TK using the well-known color quantization. More specifically, based on the color quantization, the lighting device 210 may generate 2 digits of the 6-digit TK using the R value of its RGB value, generate other 2 digits using the G value, and generate the remaining 2 digits using the B value as shown in FIG. 5. Herein, the lighting device 210 may generate the TK using the same color quantization as the electronic device 200.

In operation 717, the lighting device 210 pairs with the electronic device 200 based on the generated TK. For example, the lighting device 210 may perform the authentication based on the TK, perform the link encryption by generating an STK based on the TK, generate an LTK based on the TK and/or the STK, and use the LTK to communicate with the electronic device 200.

Next, the lighting device 210 may finish the pairing process.

By contrast, if the received RGB data does not match the generated RGB value in operation 711, the lighting device 210 determines whether the RGB mismatch results from a filter in operation 727. For example, if the lighting device 210 includes the filter in a particular color, the light output color of the lighting device 210 may differ from the RGB value generated based on the MAC address. In this case, the RGB value acquired by photographing the lighting device 210 in the electronic device 200 is different from the RGB value generated based on the MAC address of the lighting device 210. Hence, if the received RGB data does not match the generated RGB value, the lighting device 210 may determine whether the RGB mismatch results from the filter by determining whether other color values excluding the color filtered by the filter of the lighting device 210 match. For example, if using the filter of the R color, the lighting device 210 determines whether the G value and the B value excluding the R value match in the received RGB data and the generated RGB value. If the R value of the received RGB value mismatches the R value of the generated data but the G value of the received RGB value matches the G value of the generated data and the B value of the received data matches the B value of the generated data, the lighting device 210 may determine the RGB mismatch due to the filter. If the R value of the received RGB value mismatches the R value of the generated data and the G value of the received RGB value mismatches the G value of the generated data or the B value of the received RGB value mismatches the B value of the generated data, the lighting device 210 may determine that the RGB mismatch does not result from the filter.

If the filter causes the RGB mismatch, the lighting device 210 requests the white type pairing from the electronic device 200 in operation 729 and goes to operation 719.

By contrast, if the RGB mismatch does not result from the filter, the lighting device 210 determines that the electronic device 200 does not want to pair with it, and thus finishes this process.

For the white type in operation 703, the lighting device 210 randomly generates the cycle value based on the MAC address in operation 719 and emits the light based on the generated cycle value in operation 721. For example, the lighting device 210 may control to turn the light on/off for the number of times corresponding to the generated cycle value during a preset time. In operation 723, the lighting device 210 receives cycle data from the electronic device 200. For example, the lighting device 210 may receive the advertisement message over the advertising channel and extract the cycle data from the advertisement message. In operation 725, the lighting device 210 determines whether the cycle data received from the electronic device 200 matches the cycle value generated in operation 719. If the received cycle data does not match the generated cycle value, the lighting device 210 determines that the electronic device 200 does not want to pair with it and thus finishes this process.

By contrast, if the received cycle data matches the generated cycle value, the lighting device 210 determines that the electronic device 200 wants to pair with it and transmits a pairing response signal to the electronic device 200 in operation 713. As shown in FIG. 4B, the pairing response signal 420 may include IO capability being keyboard/display 421 and MITM being Yes 422. While the lighting device 210 cannot enable the input through the keyboard and the screen display and receive the TK, the lighting device 210 may set IO capability to keyboard/display 421 and MITM to Yes in the pairing response signal 420. This is to generate the TK value based on the RGB value or the lighting cycle value of the lighting device 210 and to perform the pairing in the passkey entry mode.

In operation 715, the lighting device 210 generates the TK based on the identification data, that is, the lighting cycle data. For example, the lighting device 210 may generate the TK by multiplying the cycle value by a preset value. In operation 717, the lighting device 210 pairs with the electronic device 200 based on the generated TK. For example, the lighting device 210 may perform the authentication based on the TK, perform the link encryption by generating an STK based on the TK, generate an LTK based on the TK and/or the STK, and use the LTK to communicate with the electronic device 200.

Next, the lighting device 210 may finish the pairing process.

Referring to FIGS. 3A, 3B, 6, and 7, if detecting the BT pairing event, the electronic device 200 automatically drives the camera and transmits the pairing request signal. According to an embodiment of the present disclosure, the electronic device 200 may acquire the identification data, include the identification data in the pairing request signal, and transmit the pairing request signal including the identification data. According to an embodiment of the present disclosure, the electronic device 200 may transmit the identification data to the ambient lighting devices and transmit the pairing request signal to the ambient lighting devices separately from the identification data. According to an embodiment of the present disclosure, if the pairing request signal is transmitted after the identification data acquisition, the lighting device 210 may notify the identification data at a particular time or all the time. For example, the lighting device 210 not paired yet may produce the light at the preset RGB value or cycle according to a preset manner, and produce the light according to the RGB value or the cycle randomly generated based on its MAC address at a particular time or at particular time period. For example, the lighting device 210 not paired yet may always produce the light at the RGB value or cycle randomly generated based on its MAC address.

Figure 8:
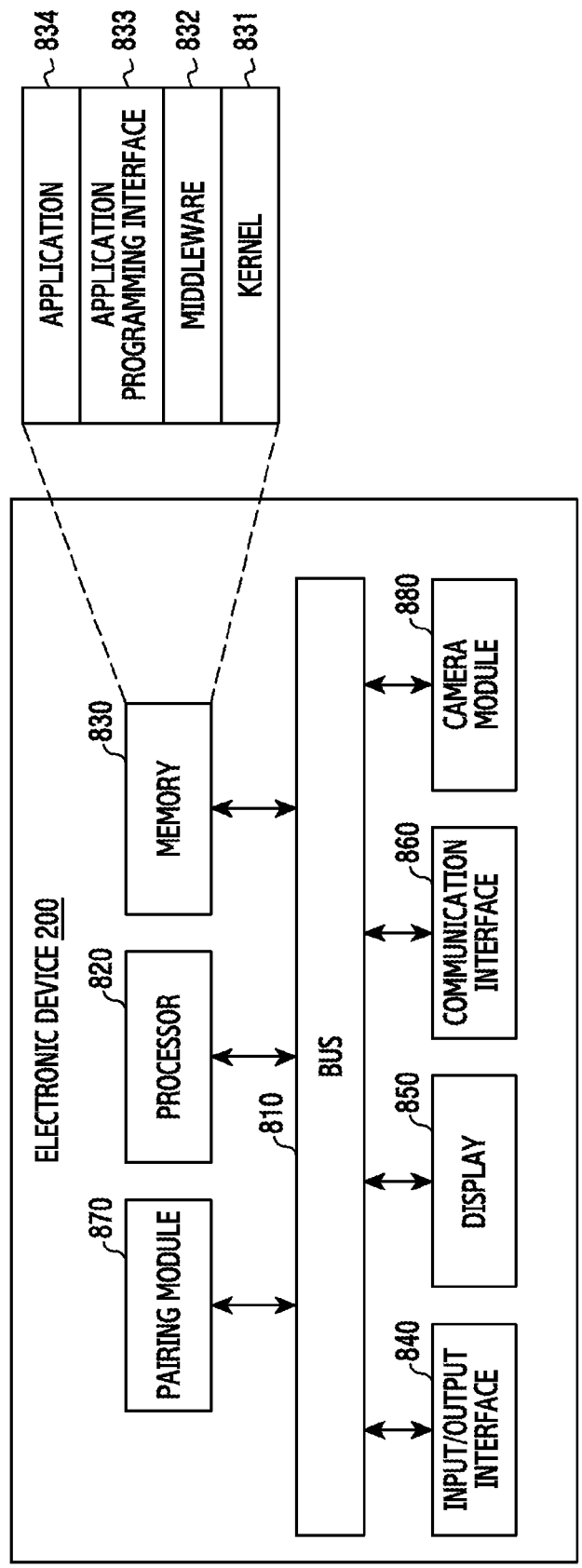
FIG. 8 illustrates an electronic device according to an embodiment of the present disclosure.

FIG. 8 is a block diagram of an electronic device according to an embodiment of the present disclosure.

Referring to FIG. 8, the electronic device 200 may include a bus 810, a processor 820, a memory 830, an IO interface 840, a display 850, a communication interface 860, a pairing module 870, and a camera module 880.

The bus 810 may be a circuit for interlinking the above-stated components and transferring communications (e.g., control messages) between the above-stated components.

The processor 820 may, for example, receive an instruction from the other components (e.g., the memory 830, the IO interface 840, the display 850, the communication interface 860, and the pairing module 870) via the bus 810, interpret the received instruction, and process an operation or data according to the interpreted instruction.

The memory 830 may store the instruction or the data received from or generated by the processor 820 or the other components (e.g., the IO interface 840, the display 850, the communication interface 860, or the pairing module 870). For example, the memory 830 may include programming modules of a kernel 831, a middleware 832, an application programming interface (API) 833, and an application 834. The programming modules may be implemented using software, firmware, or hardware, alone or in combination.

The kernel 831 may control or manage system resources (e.g., the bus 810, the processor 820, or the memory 830) used to execute the operation or the function of the other programming modules, for example, the middleware 832, the API 833, or the application 834. Also, the kernel 831 may provide an interface allowing the middleware 832, the API 833, or the application 834 to access and to control or manage the individual component of the electronic device 200.

The middleware 832 may relay data between the API 833 or the application 834 and the kernel 831. Also, for work requests received from the application 834, the middleware 832 may, for example, control (e.g., schedule or load balance) the work requests by giving priority of the system resource (e.g., the bus 810, the processor 820, or the memory 830) of the electronic device 200 to at least one application of the application 834.

The API 833, which is an interface for the application 834 to control the function provided from the kernel 831 or the middleware 832, may include at least one interface or function (e.g., instruction) for, for example, file control, window control, image processing, or text control.

The application 834 may include a short message service (SMS)/multimedia messaging service (MMS) application, an e-mail application, a calendar application, an alarm application, a health care application (e.g., an application for measuring an exercise or a blood sugar level), or an environment information application (e.g., an application for providing air pressure, humidity, or temperature information). Additionally or alternatively, the application 834 may be an application relating to information exchange between the electronic device 200 and an external electronic device (e.g., the lighting device 210 or other electronic device). The information exchange application may include, for example, a notification relay application for relaying particular information to the external electronic device, or a device management application for managing the external electronic device.

For example, the notification relay application may transmit notification information of the other application (e.g., the SMS/MMS application, the e-mail application, the health care application, or the environment information application) of the electronic device 200 to the external electronic device (e.g., the lighting device 210). Additionally or alternatively, the notification relay application may receive and forward the notification information from the external electronic device (e.g., the lighting device 210) to the user. The device management application may manage (e.g., install, delete, or update) the turn-on/turn-off, the brightness, the color, and the lighting cycle of at least part (e.g., the external electronic device (or some components)) of the external electronic device (e.g., the lighting device 210) communicating with the electronic device 200, or manage the application running on the external electronic device or a service provided by the external electronic device.

The application 834 may include an application designated based on an attribute (e.g., a type of the lighting device) of the external electronic device. For example, if the external electronic device is a lighting device, the application 834 may include a lighting application. The application 834 may include at least one of the applications designated in the electronic device 200 or the application received from the external electronic device (e.g., a server or other electronic device).

The IO interface 840 may forward the instruction or the data input from the user through an IO device (e.g., a sensor, a keyboard, or a touch screen) to, for example, the processor 820, the memory 830, the communication interface 860, or the pairing module 870 via the bus 810. For example, the IO interface 840 may forward user's touch data input through the touch screen, to the processor 820. Also, the IO interface 840 may output the instruction or the data received from the processor 820, the memory 830, the communication interface 860, or the pairing module 870 via the bus 810, through the IO device (e.g., a speaker or a display). For example, the IO interface 840 may output voice data processed by the processor 820 to the user through the speaker.

The display 850 displays various information (e.g., multimedia data or text data) to the user.

The communication interface 860 connects the communication between the electronic device 200 and an external device (e.g., the lighting device, other electronic device, or the server). For example, the communication interface 860 may communicate with the external device over a network using wireless communication or wired communication. For example, the wireless communication may include at least one of Wi-Fi, BT, near field communication (NFC), GPS, and cellular communication (e.g., long term evolution (LTE), LTE-advanced (LTE-A), wideband code division multiple access (WCDMA), universal mobile telecommunications system (UMTS), wireless broadband (WiBro), or global system for mobile communications (GSM)). The wired communication may include at least one of, for example, universal serial bus (USB), high definition multimedia interface (HDMI), recommended standard (RS) 232, and plain old telephone service (POTS). For example, the communication interface 860 may communicate with the lighting device using BT.

The network may be a telecommunications network. The telecommunications network may include at least one of a computer network, internet, internet of things, and a telephone network. A protocol (e.g., transport layer protocol, data link layer protocol, or physical layer protocol) for the communication between the electronic device 200 and the external device may be supported by at least one of the application 834, the API 833, the middleware 832, the kernel 831, and the communication interface 860.

The camera module 880 is a device for photographing a still picture and a moving picture, and may include one or more image sensors (e.g., a front sensor or a rear sensor), a lens (not shown), an image signal processor (ISP) (not shown), or a flash (e.g., light emitting diode (LED) or xenon lamp) (not shown). The camera module 880 may be automatically driven by the pairing module 870 and/or the processor 820 to photograph a still picture and/or a moving picture.

The pairing module 870 may process at least part of information acquired from the other components (e.g., the processor 820, the memory 830, the IO interface 840, and the communication interface 860), and provide at least one processed information to the user in various manners. For example, using or independently from the processor 820, the pairing module 870 may control the electronic device 200 to communicate with the lighting device 210 using the pairing. The pairing module 870 may control the camera module 880 to photograph a still picture and/or a moving picture including the lighting device, and acquire RGB data indicating the color of the lighting device or cycle data indicating the output cycle of the lighting device from the photographed still picture and/or moving picture. Further, in association with the communication interface 860, the pairing module 870 may transmit the RGB data or the cycle data acquired from the still picture and/or the moving picture, to the lighting device 210. Further, the pairing module 870 may detect the pairing response message received from the lighting device 210 through the communication interface 860, and generate the TK based on the RGB data or the cycle data. In association with the communication interface 860, the pairing module 870 may generate the STK and the LTK based on the TK and thus carry out the authentication and the link layer encryption for the pairing. The pairing module 870 shall be further described in FIG. 9.

Figure 9:
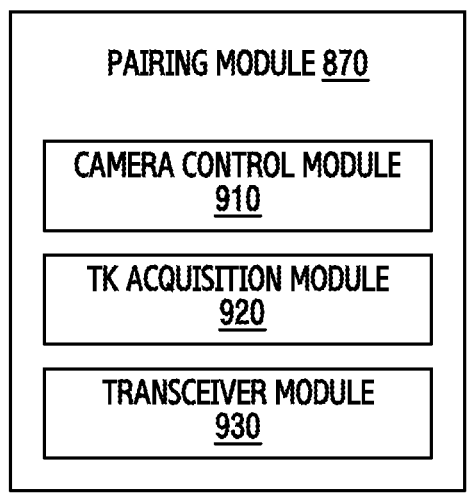
FIG. 9 illustrates a pairing module of an electronic device according to an embodiment of the present disclosure.

FIG. 9 illustrates a pairing module of an electronic device according to an embodiment of the present disclosure.

Referring to FIG. 9, the pairing module 870 may include a camera control module 910, a TK acquisition module 920, and a transceiver module 930.

The camera control module 910 determines whether the BT pairing event arises, based on the information acquired from the other components (e.g., the processor 820, the memory 830, the IO interface 840, and the communication interface 860). Upon detecting the BT pairing event, the camera control module 910 may control the camera module 880 to photograph the lighting device.

The TK acquisition module 920 acquires the RGB data or the cycle data from the still picture or the moving picture photographed by the camera module 880, and generates the TK based on the acquired RGB data or cycle data. For example, the TK acquisition module 920 may generate the 6-digit TK by multiplying the cycle data by the preset value. For example, the TK acquisition module 920 may convert the RGB data to the 6-digit TK using the color quantization.

The transceiver module 930 may process to transmit and receive the messages for the pairing of the electronic device 200 and the lighting device 210. For example, the transceiver module 930 may control to generate the advertisement message including the RGB data or the cycle data acquired by the TK acquisition module 920, and to transmit the advertisement message over the advertising channel in association with the communication interface 860. In addition, the transceiver module 930 may control to transmit the pairing request signal and to receive the pairing response signal as shown in FIGS. 4A and 4B.

The pairing module 870 may control the electronic device 200 to perform the functions of FIGS. 3A and 6.

The pairing module 870 of FIGS. 8 and 9 may be included in the processor 820.

Figure 10:
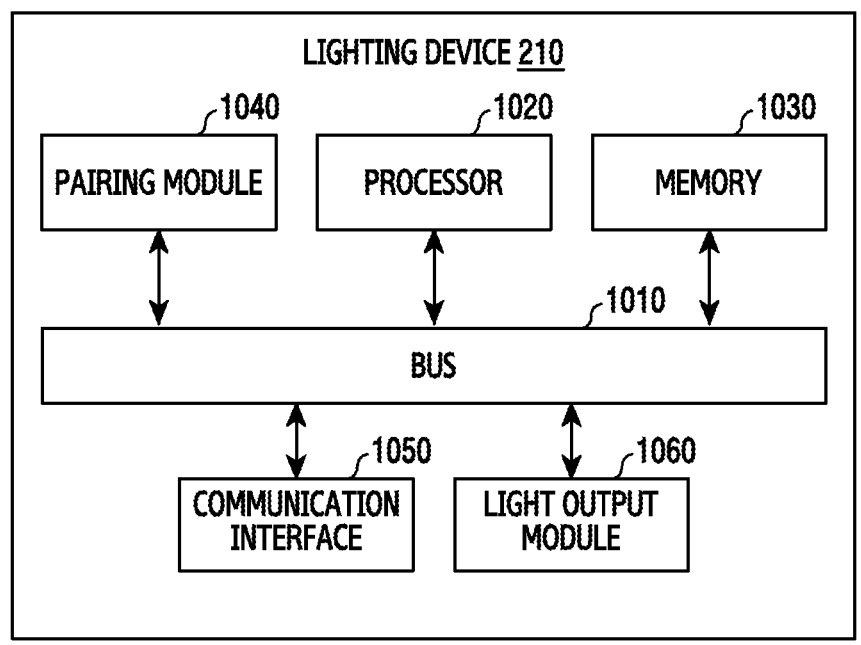
FIG. 10 illustrates a lighting device according to an embodiment of the present disclosure.

FIG. 10 illustrates a lighting device according to an embodiment of the present disclosure.

Referring to FIG. 10, the lighting device 210 may include a bus 1010, a processor 1020, a memory 1030, a pairing module 1040, a communication interface 1050, and a light output module 1060.

The bus 1010 may be a circuit for interlinking the above-stated components and transferring communications (e.g., control messages) between the above-stated components.

The processor 1020 may, for example, receive an instruction from the other components (e.g., the memory 1030, the communication interface 1050, and the pairing module 1040) via the bus 1010, interpret the received instruction, and process an operation or data according to the interpreted instruction.

The memory 1030 may store the instruction or the data received from or generated by the processor 1020 or the other components (e.g., the communication interface 1050 or the pairing module 1040). For example, the memory 1030 may include programming modules of a kernel, a middleware, an API, and an application. The programming modules may be implemented using software, firmware, or hardware, alone or in combination.

The application (not shown) may include an application for controlling the on/off, the brightness, the output cycle, and the color of the lighting device. Additionally or alternatively, the application may pertain to information exchange between the lighting device 210 and the electronic device 200. The application may include an application designated according to the attribute (e.g., the type) of the lighting device 210.

The communication interface 1050 may connect the communication between the lighting device 210 and the external device (e.g., the electronic device 200 or the server). For example, the communication interface 1050 may communicate with the external device over a network using wireless communication or wired communication. For example, the wireless communication may include at least one of Wi-Fi, BT, NFC, GPS, and cellular communication (e.g., LTE, LTE-A, WCDMA, UMTS, WiBro, or GSM). The wired communication may include at least one of, for example, USB, HDMI, RS 232, and POTS. For example, the communication interface 1050 may communicate with the electronic device 200 using BT.

The pairing module 1040 may process at least part of information acquired from the other components (e.g., the processor 1020, the memory 1030, and the communication interface 1050), and provide at least one processed information to the user in various manners. For example, using or independently from the processor 1020, the pairing module 1040 may control to communicate with the electronic device 200 using the pairing. The pairing module 1040 may generate the identification data (e.g., the RGB value or the cycle value) based on the MAC address and output the light based on the identification data in association with the light output module 1060. In addition, the pairing module 1040 may determine whether the electronic device 200 wants to pair with its lighting device by comparing the identification data received from the electronic device 200 with the identification data generated based on the MAC address. If the electronic device 200 wants to pair with its lighting device, the pairing module 1040 may transmit the pairing response message as shown in FIGS. 4A and 4B and thus carry out the pairing in the passkey entry mode. The pairing module 1040 may generate the TK based on the identification data, generate the STK and the LTK based on the generated TK, and perform the authentication and the link layer encryption.

The light output module 1060 outputs the light under the control of the processor 1020 or the pairing module 1040. For example, the light output module 1060 may output the light in the color corresponding to the RGB value under the control of the pairing module 1040. For example, the light output module 1060 may control to turn on/off the light for the number of times corresponding to the cycle value during a preset time under the control of the pairing module 1040. The light output module 1060 may include the filter for filtering at least one color (e.g., R color, G color, B color).

The processor 1020 may include at least one of the pairing module 1040 and the light output module 1060 of FIG. 10.

While the identification data of the lighting device uses one of the light color value and the light output cycle, the identification data of the lighting device may use both of the light color value and the light output cycle.

As set forth above, the electronic device photographs the lighting device to pair with, acquires the identification data of the corresponding lighting device, and transmits the acquired identification data to the ambient lighting devices so as to notify the lighting device to pair with. Thus, the electronic device may fulfill the pairing accurately by selecting the user's intended device. In addition, the electronic device and the lighting devices generate the TK based on the data acquired by photographing the lighting device and encrypt the pairing using the generated TK, to thus avoid the MITM and enhance security.

The present operations may be fulfilled by the single controller. Program instructions executable by various computers may be recorded in a computer-readable recording medium. The computer-readable recording medium can include a program instruction, a data file, and a data structure alone or in combination. The program instruction can be specially designed for the present disclosure or well-known to those skilled in computer software. The computer-readable recording medium can include magnetic media such as hard disk, floppy disk and magnetic tape, optical media such as compact disc read only memory (CD-ROM) and DVD, magneto-optical media such as floptical disk, and hardware devices specifically configured to store and execute the program instruction such as ROM, random access memory (RAM), and flash memory. The program instruction can include not only a machine code made by a compiler but also a high-level language code executable by a computer using an interpreter. If whole or part of a base station or a relay station is realized as a computer program, the computer-readable recording medium storing the computer program falls within the present disclosure.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for operating an electronic device, the method comprising:
   transmitting a pairing request signal to a lighting device in response to a detection of a pairing event;
   generating at least one of an image or a video for light emitted from the lighting device by photographing or filming the lighting device, the light being determined, by the lighting device, based on first identification data of the lighting device;
   determining second identification data of the lighting device from the image or the video; and
   pairing with the lighting device by transmitting the second identification data to the lighting device, if it is determined, by the lighting device, that the first identification data is identical to the second identification data, wherein the first identification data is determined based on a media access control (MAC) address of the lighting device,
wherein the second identification data is determined based on at least one of a color value from the image or a cycle value from the video,
wherein the color value indicates a red green blue (RGB) value of the light emitted from the lighting device, and
wherein the cycle value indicates an on/off number of the light emitted from the lighting device during a preset time duration.

2. The method of claim 1, wherein the pairing with the lighting device by transmitting the second identification data to the lighting device comprises:
transmitting the second identification data to at least one lighting device comprising the lighting device;
receiving a signal for pairing from the lighting device;
determining a temporary key based on the second identification data; and
performing at least one of authentication and link layer encryption with the lighting device based on the temporary key.

3. The method of claim 2, wherein the signal for the pairing comprises a pairing response signal comprising information indicating keyboard input and display and information indicating protection from a man-in-the-middle attack (MITM).

4. The method of claim 1, further comprising:
driving a camera in response to the transmitting of the pairing request signal.

5. A method for operating a lighting device, the method comprising:
receiving a pairing request signal from an electronic device;
outputting light in response to the pairing request signal, based on first identification data of the lighting device;
receiving second identification data from the electronic device;
determining whether to pair with the electronic device by comparing the first identification data with the second identification data; and
pairing with the electronic device if the first identification data is identical to the second identification data,
wherein the first identification data is determined based on a media access control (MAC) address of the lighting device,
wherein the second identification data is determined, by the electronic device, based on at least one of a color value of the light or a cycle value of the light,
wherein the color value indicates a red green blue (RGB) value of the light emitted from the lighting device, and
wherein the cycle value indicates an on/off number of the light emitted from the lighting device during a preset time duration.

6. The method of claim 5, wherein the pairing with the electronic device comprises:
transmitting a signal for pairing to the electronic device;
determining a temporary key based on the first identification data; and
performing at least one of authentication and link layer encryption with the electronic device based on the temporary key,
wherein the signal for the pairing comprises a pairing response signal comprising information indicating keyboard input and display and information indicating protection from a man-in-the-middle attack (MITM).

7. An electronic device comprising:
a transceiver;
a camera; and
a processor configured to:
transmit a pairing request signal to a lighting device in response to a detection of a pairing event,
generate at least one of an image or a video for light emitted from the lighting device by photographing or filming the lighting device, the light being determined, by the lighting device, based on first identification data of the lighting device,
determine second identification data of the lighting device from the image or the video, and
pair with the lighting device by transmitting the second identification data to the lighting device, if it is determined, by the lighting device, that the first identification data is identical to the second identification data,
wherein the first identification data is determined based on a media access control (MAC) address of the lighting device,
wherein the second identification data is determined based on at least one of a color value from the image or a cycle value from the video,
wherein the color value indicates a red green blue (RGB) value of the light emitted from the lighting device, and
wherein the cycle value indicates on/off number of the light emitted from the lighting device during a preset time duration.

8. The electronic device of claim 7, wherein the processor is further configured to:
transmit the second identification data to at least one lighting device comprising the lighting device,
receive a signal for pairing from the lighting device,
generate a temporary key based on the second identification data, and
perform at least one of authentication and link layer encryption with the lighting device based on the temporary key.

9. The electronic device of claim 8, wherein the signal for the pairing comprises a pairing response signal comprising information indicating keyboard input and display and information indicating protection from a man-in-the-middle attack (MITM).

10. The electronic device of claim 7, wherein the processor is further configured to:
drive a camera in response to the transmitting of the pairing request signal.

11. A lighting device comprising:
a transceiver;
a light output device; and
a processor configured to:
receive a pairing request signal from an electronic device,
output light in response to the pairing request signal, based on first identification data of the lighting device,
receive second identification data from the electronic device,
determine whether to pair with the electronic device by comparing the second identification data with the first identification data, and
pair with the electronic device, if the first identification data is identical to the second identification data, wherein the first identification data is determined based on a media access control (MAC) address of the lighting device, wherein the second identification data is determined, by the electronic device, based on at least one of a color value of the light or a cycle value of the light, wherein the color value indicates a red green blue (RGB) value of the light emitted from the lighting device, and wherein the cycle value indicates an on/off number of the light emitted from the lighting device during a preset time duration.

12. The lighting device of claim 11, wherein the processor is further configured to:

transmit a signal for pairing to the electronic device, generate a temporary key based on the first identification data, and perform at least one of authentication and link layer encryption with the electronic device based on the temporary key, wherein the signal for the pairing comprises a pairing response signal comprising information indicating keyboard input and display and information indicating protection from a man-in-the-middle attack (MITM).

13. The method of claim 6, wherein the determining of the temporary key based on the first identification data comprises:

determining the temporary key by multiplying a predetermined value to the cycle value or by quantizing the RGB value, wherein the color quantization is one of a uniform color quantization, a popularity algorithm, a median cut algorithm or an octree algorithm.

14. The lighting device of claim of 12, wherein the generation of the temporary key based on the first identification data comprises:

generating the temporary key by multiplying a predetermined value to the cycle value or by quantizing the RGB value, wherein the color quantization is one of a uniform color quantization, a popularity algorithm, a median cut algorithm or an octree algorithm.

\* \* \* \* \*